US011190314B2

(12) United States Patent
Byun et al.

(10) Patent No.: US 11,190,314 B2
(45) Date of Patent: Nov. 30, 2021

(54) METHOD AND APPARATUS FOR TRANSMITTING UPLINK DATA IN WIRELESS COMMUNICATION SYSTEM

(71) Applicant: LG ELECTRONICS INC., Seoul (KR)

(72) Inventors: Ilmu Byun, Seoul (KR); Heejeong Cho, Seoul (KR); Genebeck Hahn, Seoul (KR); Jiwon Kang, Seoul (KR); Heejin Kim, Seoul (KR); Hyunjin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 607 days.

(21) Appl. No.: 16/087,356

(22) PCT Filed: Mar. 23, 2017

(86) PCT No.: PCT/KR2017/003102
§ 371 (c)(1),
(2) Date: Sep. 21, 2018

(87) PCT Pub. No.: WO2017/171302
PCT Pub. Date: Oct. 5, 2017

(65) Prior Publication Data
US 2021/0211251 A1    Jul. 8, 2021

Related U.S. Application Data

(60) Provisional application No. 62/316,599, filed on Apr. 1, 2016.

(51) Int. Cl.
*H04L 5/00* (2006.01)
*H04W 72/12* (2009.01)
*H04W 74/08* (2009.01)

(52) U.S. Cl.
CPC ....... *H04L 5/0048* (2013.01); *H04W 72/1268* (2013.01); *H04W 74/0833* (2013.01)

(58) Field of Classification Search
CPC combination set(s) only.
See application file for complete search history.

(56) References Cited

U.S. PATENT DOCUMENTS

2010/0085956 A1    4/2010  Ahn et al.
2012/0208545 A1*   8/2012  Yang ................... H04W 74/002
                                                              455/450

(Continued)

FOREIGN PATENT DOCUMENTS

KR    1020150129061    11/2015
WO    2013138701       9/2013
WO    2016029958       3/2016

OTHER PUBLICATIONS

PCT International Application No. PCT/KR2017/003102, International Search Report dated May 24, 2017, 6 pages.

*Primary Examiner* — Yee F Lam
(74) *Attorney, Agent, or Firm* — Lee Hong Degerman Kang & Waimey

(57) ABSTRACT

Provided are a method and an apparatus for transmitting uplink data in a wireless communication system. Specifically, a first terminal transmits a random access preamble for requesting a connectionless transmission. The first terminal receives a random access response comprising scheduling information of the uplink data. The first terminal transmits the uplink data, a reference signal selected by the terminal and terminal identification information of the terminal from a first overlapping resource utilized by a second terminal. The first terminal receives, as a response for the uplink data, a response signal comprising a terminal identification infor- (Continued)

mation field containing terminal identification information corresponding to each reference signal.

11 Claims, 12 Drawing Sheets

(56) References Cited

U.S. PATENT DOCUMENTS

| | | | |
|---|---|---|---|
| 2012/0281679 A1* | 11/2012 | Fan | H04W 74/008 370/336 |
| 2013/0039195 A1 | 2/2013 | Weng et al. | |
| 2013/0301611 A1* | 11/2013 | Baghel | H04W 72/04 370/331 |
| 2016/0014815 A1* | 1/2016 | Vajapeyam | H04W 4/70 370/329 |
| 2016/0338092 A1* | 11/2016 | Agiwal | H04W 76/14 |
| 2016/0374048 A1* | 12/2016 | Griot | H04W 68/005 |
| 2017/0201360 A1* | 7/2017 | Shin | H04J 13/004 |

* cited by examiner

METHOD AND APPARATUS FOR TRANSMITTING UPLINK DATA IN WIRELESS COMMUNICATION SYSTEM

CROSS-REFERENCE TO RELATED APPLICATIONS

This application is the National Stage filing under 35 U.S.C. 371 of International Application No. PCT/KR2017/003102, filed on Mar. 23, 2017, which claims the benefit of U.S. Provisional Application No. 62/316,599, filed on Apr. 1, 2016, the contents of which are all hereby incorporated by reference herein in their entireties.

BACKGROUND OF THE INVENTION

Field of the Invention

The present invention relates to wireless communication and, more particularly, to a method for transmitting uplink data in a wireless communication system and an apparatus using the same.

Related Art

A wireless communication system is widely deployed to provide various types of communication services, such as voice and data. An object of a wireless communication system is to enable a plurality of UEs to perform reliable communication regardless of their locations and mobility.

In general, a wireless communication system is a multiple access system capable of supporting communication with a plurality of UEs by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a 3GPP LTE system, a UE in an idle state needs to establish an RRC connection and a data connection before performing data transmission. That is, both a logical connection (RRC connection) between a BS and a UE and a logical connection (S1 connection/interface, EPS connection) between a mobility management entity (MME) and a UE need to be established. For a UE to perform data transmission, time necessary to establish these connections are further taken. However, it is inefficient to establish a connection when a UE transmits or receives a small amount of data once or twice. Therefore, a connectionless transmission scheme may be considered to solve this problem.

SUMMARY OF THE INVENTION

The present invention provides a method and an apparatus for transmitting uplink data in a wireless communication system.

The present invention proposes a method for transmitting uplink data on the basis of a connectionless transmission procedure in a wireless communication system.

Defining terms first, a connectionless transmission procedure may correspond to a procedure in which a user equipment (UE) transmits data to a base station (BS) in a state where a connection between the UE and the BS is not established. The state where the connection between the UE and the BS is not established may correspond to an RRC-unconnected state, an idle state, or an inactive state.

A first UE transmits a random access preamble for requesting connectionless transmission to a BS. Here, it is assumed that the first UE and a second UE transmit a random access preamble to the BS via the same resource and perform a connectionless transmission procedure. When the same resource is referred to as a second overlapping resource, the first UE and the second UE transmit the random access preamble via the second overlapping resource. The random access preamble may correspond to message 1 in a random access procedure.

The first UE receives a random access response including scheduling information for uplink data from the BS. The second UE also transmits the random access preamble and thus may also receive the random access response including the scheduling information for the uplink data from the BS. The random access response may correspond to message 2 in the random access procedure.

The first UE transmits the uplink data, a reference signal selected by the first UE, and UE identifier identifier information on the first UE via a first overlapping resource used by the second UE. Since the first UE and the second UE receive the same scheduling information for the uplink data from the BS, the first UE and the second UE transmit uplink data via the first overlapping resource. Here, each UE arbitrarily selects a reference signal for contention resolution. The uplink data may be transmitted via the first overlapping resource in a non-orthogonal multiple access (NoMA) scheme or a multi-user multiple-input and multiple-output (MU-MIMO) scheme. That is, the BS receives a signal from each UE via the overlapping resource in the NoMA scheme or the MU-MIMO scheme. The uplink data, the reference signal selected by the first UE, and the identifier information on the first UE may be included in message 3 in the random access procedure.

The first UE receives a response signal including a UE identifier information field. including UE identifier information corresponding to each reference signal in response to the uplink data. The response signal may correspond to message 4 in the random access procedure.

The UE identifier information field further includes a bitmap indicating whether there is UE identifier information corresponding to each reference signal. The UE identifier information corresponding to each reference signal includes UE identifier information corresponding to the reference signal selected by the first UE and UE identifier information corresponding to a reference signal selected by the second UE according to the bitmap. That is, the UE identifier information field includes UE identifier information that corresponds to a reference signal selected by each UE one to one.

Here, when the UE identifier information corresponding to the reference signal selected by the first UE indicates NULL, the random access preamble is retransmitted or scheduling information for retransmitting the uplink data is included in the response signal. The UE identifier information corresponding to each reference signal included in the UE identifier information field indicates NULL, which means that the BS has failed to decode message 3 transmitted by a UE that has selected the corresponding reference signal. When the reason for the failure of decoding of message 3 is a collision between data, the UE needs to perform the random access procedure again. When the reason for the failure of decoding of message 3 is poor channel quality, the BS includes scheduling information for retransmitting the uplink data in the response signal once again.

On the contrary, when the UE identifier information corresponding to the reference signal selected by the first UE does not indicate NULL, the UE identifier information corresponding to the reference signal selected by the first UE is the UE identifier information on the first UE. Thus, the first UE verifies that the UE identifier information thereof matches the UE identifier information transmitted via the response signal and determines the response signal as an acknowledgement (ACK).

The response signal may be multicast or unicast to the first UE and the second UE. According to a multicast scheme, the random access response may further include a common temporary ID for the first UE and the second UE, and the first UE and the second UE may decode the response signal using the common temporary ID. According to a unicast method, the random access response may further include a first temporary ID for the first UE and a second temporary ID for the second UE, the first UE may decode the response signal using the first temporary ID, and the second UE may decode the response signal using the second temporary ID. That is, the BS transmits a mapping relationship between a reference signal and a temporary ID to a UE when transmitting the random access response. The temporary ID transmitted via the random access response may be a separate temporary ID for each UE.

The present invention proposes an apparatus for transmitting uplink data on the basis of a connectionless transmission procedure in a wireless communication system.

Defining terms first, a connectionless transmission procedure may correspond to a procedure in which a UE transmits data to a BS in a state where a connection between the UE and the BS is not established. The state where the connection between the UE and the BS is not established may correspond to an RRC-unconnected state, an idle state, or an inactive state.

The apparatus may be a UE. The UE may be a first UE, and another UE may be a second UE.

The apparatus includes a radio frequency (RF) unit to transmit and receive a radio signal and a processor connected to the RF unit. First, the processor transmits a random access preamble for requesting connectionless transmission. The processor receives a random access response including scheduling information for uplink data. The processor transmits the uplink data, a reference signal selected by the UE, and UE identifier information on the UE via a first overlapping resource used by the other UE. The processor receives a response signal including a UE identifier information field including UE identifier information corresponding to each reference signal in response to the uplink data.

According to the proposed method, even when UEs transmit message 3 via the same resource, the BS may decode signals from the UEs and may notify each UE whether on message 3 is successfully decoded. Accordingly, the probability of success of connectionless transmission increases, thereby reducing the number of times a UE repeats a random access procedure due to the failure of transmission.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
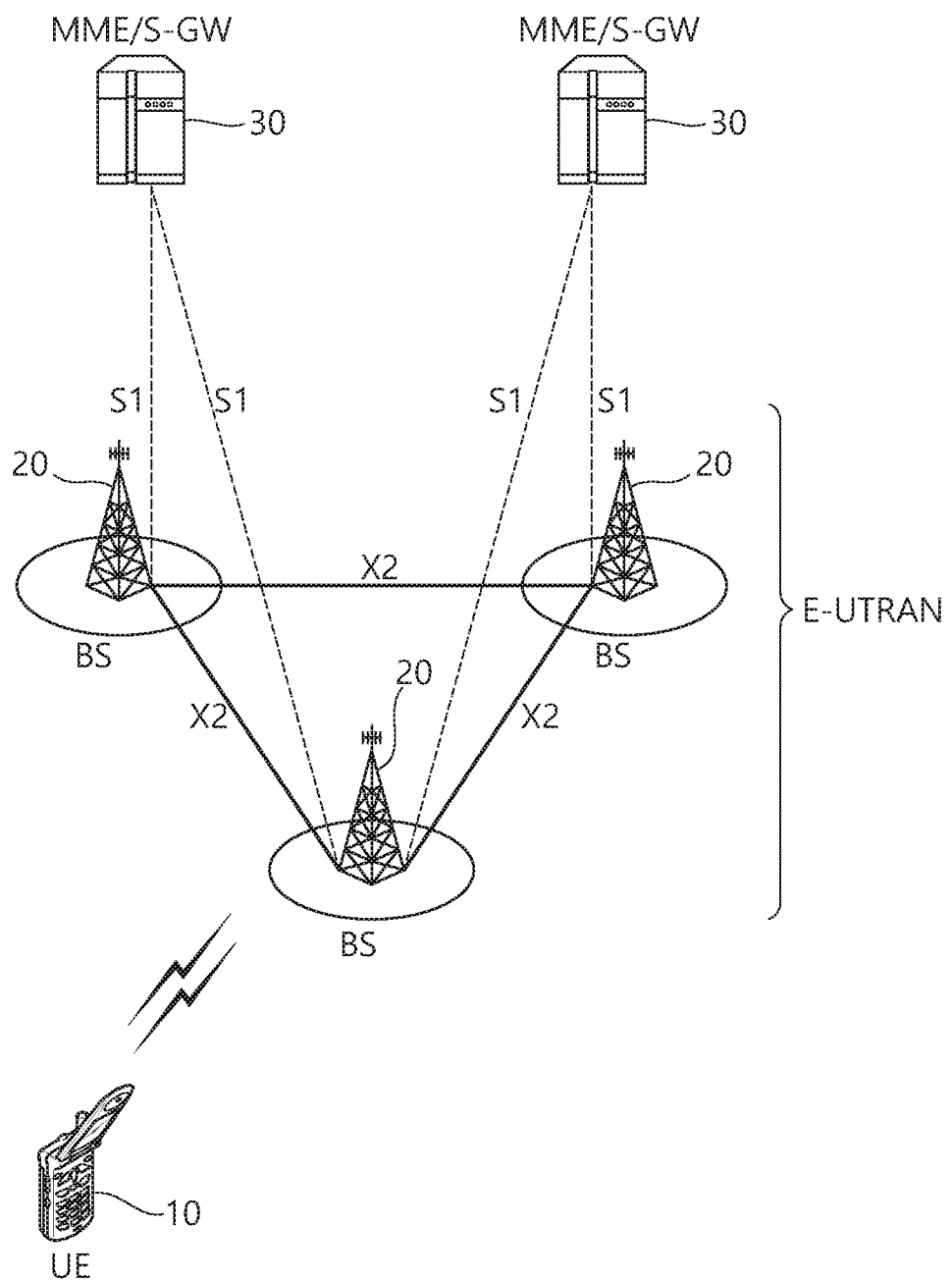
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
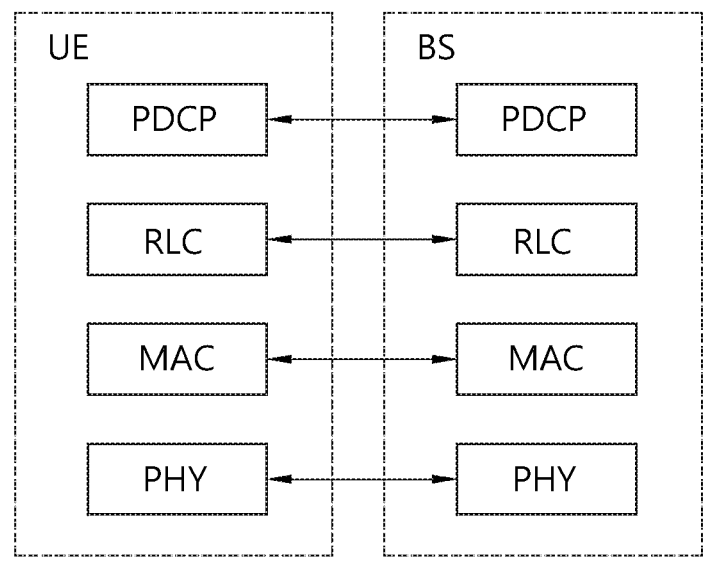
FIG. 2 is a diagram illustrating a radio protocol architecture for a user plane.
Figure 3:
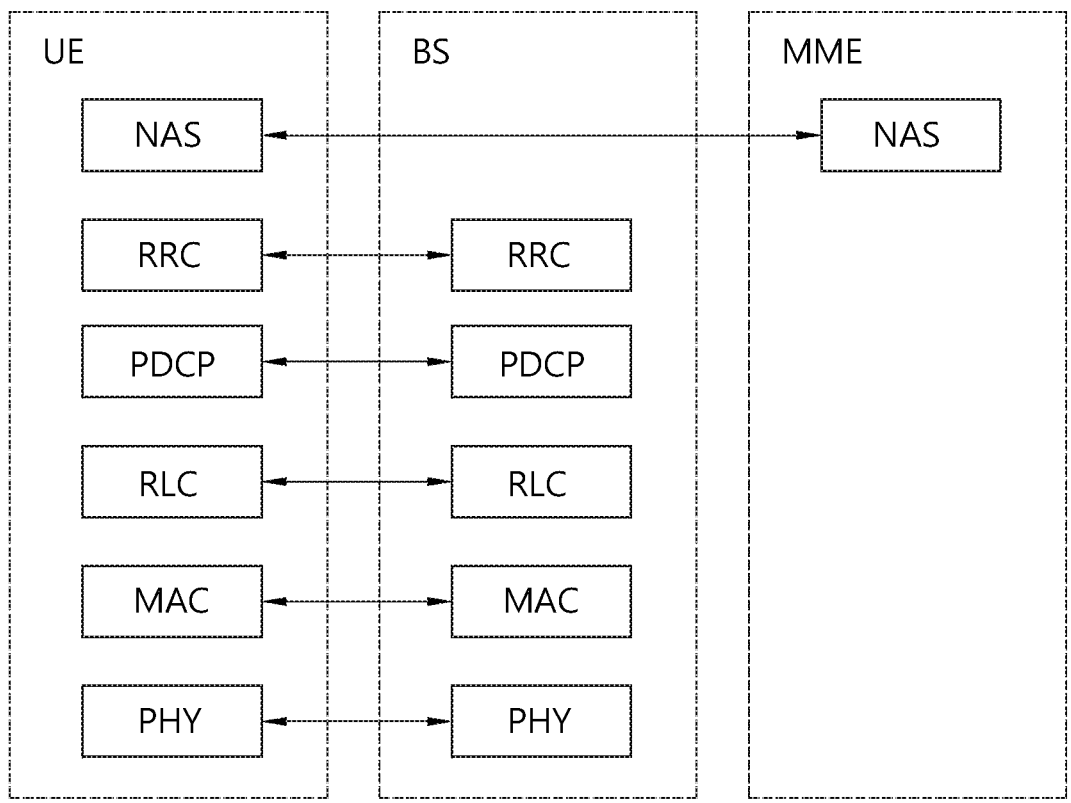
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC-connected state, and otherwise the UE is in an RRC idle state.

Data is transmitted from the network to the UE through a downlink transport channel Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
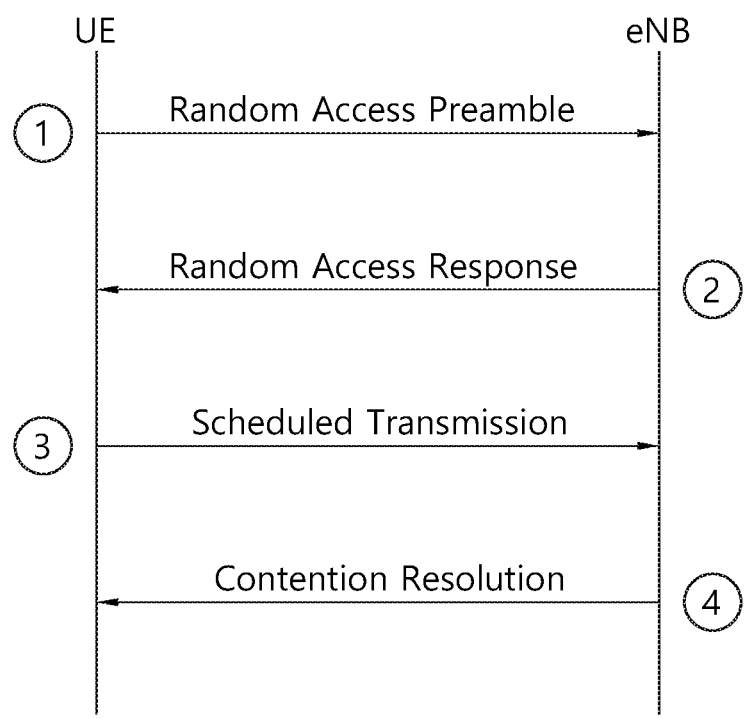
FIG. 4 shows an operation procedure between a user equipment and a base station in a contention based random access procedure.

FIG. 4 shows an operation procedure between a UE and a BS in a contention based random access procedure.

First, a UE in the contention based random access randomly may select a random access preamble within a group of random access preambles indicated through system information or a handover command, may select PRACH resources capable of transmitting the random access preamble, and then may transmit the selected random access preamble to a BS (Step 1).

After transmitting the random access preamble, the UE may attempt to receive a response with respect to its random access preamble within a random access response reception window indicated through the system information or the handover command (Step 2). More specifically, the random access response information is transmitted in a form of MAC PDU, and the MAC PDU may be transferred on the Physical Downlink Shared Channel (PDSCH). In addition, the Physical Downlink Control Channel (PDCCH) is also transferred such that the UE appropriately receives information transferred on the PDSCH. That is, the PDCCH may include information about a UE that should receive the PDSCH, frequency and time information of radio resources of the PDSCH, a transfer format of the PDSCH, and the like. Here, if the PDCCH has been successfully received, the UE may appropriately receive the random access response transmitted on the PDSCH according to information of the PDCCH. The random access response may include a random access preamble identifier (ID), an UL Grant, a temporary C-RNTI, a Time Alignment Command, and the like. Here, the random access preamble identifier is included in the random access response in order to notify UEs to which information such as the UL Grant, the temporary C-RNTI, and the Time Alignment Command would be valid (available, effective) because one random access response may include random access response information for one or more UEs. Here, the random access preamble identifier may be identical to the random access preamble selected by the UE in Step 1.

If the UE has received the random access response valid to the UE itself, the UE may process each of the information included in the random access response. That is, the UE stores the temporary C-RNTI. In addition, the UE uses the UL Grant so as to transmit data stored in a buffer of the UE or newly generated data to the BS (Step 3). Here, a UE identifier should be essentially included in the data which is included in the UL Grant (message 3). This is because, in the contention based random access procedure, the BS may not determine which UEs are performing the random access procedure, but later the UEs should be identified for contention resolution. Here, two different schemes may be provided to include the UE identifier. A first scheme is to transmit the UE's cell identifier through the UL Grant if the UE has already received a valid cell identifier allocated in a corresponding cell prior to the random access procedure. Conversely, the second scheme is to transmit the UE's unique identifier (e.g., S-TMSI or random ID) if the UE has not received a valid cell identifier prior to the random access procedure. In general, the unique identifier is longer than the cell identifier. In Step 3, if the UE has transmitted data through the UL Grant, the UE starts the contention resolution timer.

After transmitting the data with its identifier through the UL Grant included in the random access response, the UE waits for an indication (instruction) of the BS for the contention resolution. That is, the UE attempts to receive the PDCCH so as to receive a specific message (Step 4). Here, there are two schemes to receive the PDCCH. As described above, if the UE identifier transmitted via the UL Grant is the cell identifier, the UE attempts to receive the PDCCH by using its own cell identifier. If the UE identifier transmitted via the UL Grant is its unique identifier, the UE attempts to receive the PDCCH by using the temporary C-RNTI included in the random access response. Thereafter, for the former, if the PDCCH (message 4) is received through its cell identifier before the contention resolution timer is expired, the UE determines that the random access procedure has been successfully (normally) performed, thus to complete the random access procedure. For the latter, if the PDCCH is received through the temporary cell identifier before the contention resolution timer is expired, the UE checks data (message 4) transferred by the PDSCH that the PDCCH indicates. If the unique identifier of the UE is included in the data, the UE determines that the random access procedure has been successfully (normally) performed, thus to complete the random access procedure.

Hereinafter, connectionless transmission will be described.

In a 3GPP LTE system, a UE in an idle state needs to establish an RRC connection and a data connection before performing data transmission. That is, both a logical connection (RRC connection) between a BS and a UE and a logical connection (S1 connection/interface, EPS connection) between a mobility management entity (MME) and a UE need to be established.

Figure 5:
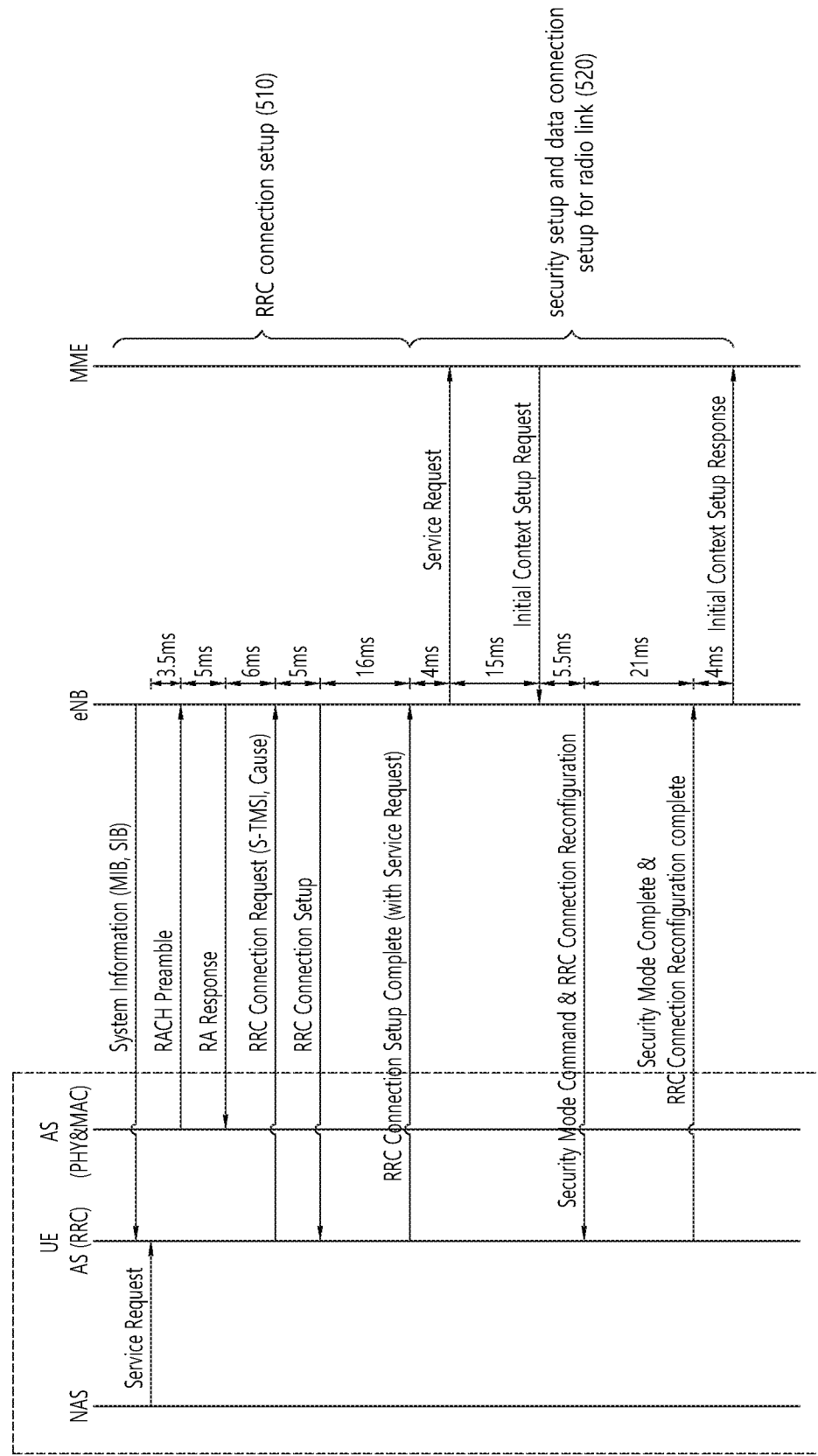
FIG. 5 shows a procedure and required time for connection setup in 3GPP LTE.

FIG. 5 shows a procedure and required time for connection setup in 3GPP LTE.

Referring to FIG. 5, a UE perforans RRC connection setup 510 with a BS (eNB) before transmitting data. The UE receives system information, such as a master information block (MIB) and a system information block (SIB), from the BS. The UE transmits a random access preamble through an RACH resource and receives a random access response in response to the random access preamble. Then, the UE transmits RRC connection request message to the BS and receives an RRC connection setup message from the BS. When the UE transmits an RRC connection setup complete message to the BS, RRC connection setup 510 may be achieved.

When RRC connection setup 510 with the BS is achieved, the UE performs security setup and data connection setup 520 for a radio link with a mobility management entity (MME). The BS makes a service request to the MME, and the MME transmits an initial context setup request to the BS. The BS transmits a security mode command and an RRC connection reconfiguration message to the UE. The UE transmits a security mode complete message and an RRC connection reconfiguration complete message to the BS. Then, the BS transmits an initial context setup request to the MME. Accordingly, the UE may achieve security setup and data connection setup 520 for the radio link with the MME.

Since a total of 35.5 ms is required for RRC connection setup 510 and a total of 49.5 ms for security setup and data connection setup 520 for the radio link, it takes 85 ms in total to switch the connection state of the UE in the idle state.

To transmit uplink data after switching the connection state of the UE, the UE needs to make a scheduling request to the BS. A procedure for transmitting uplink data and a delay caused thereby are described with reference to FIGS. 6 and 7.

Figure 6:
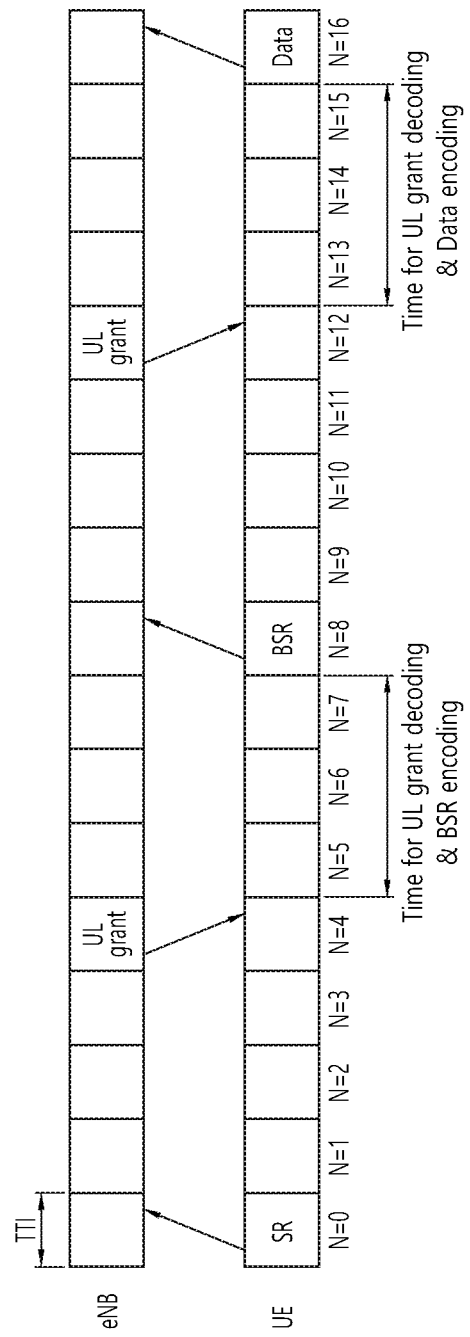
FIG. 6 shows time required for an uplink resource allocation scheme through a scheduling request in 3GPP LTE.

FIG. 6 shows time required for an uplink resource allocation scheme through a scheduling request in 3GPP LTE.

Referring to FIG. 6, a UE makes a scheduling request (SR) to a BS, and the BS transmits a UL grant to the UE. The UE decodes the UL grant and encodes a buffer status report (BSR) for a certain period of time. Then, the UE transmits the encoded BSR to the BS, the BS transmits a UL grant to the UE, and the UE transmits data to the BS according to the UL grant. This uplink resource allocation scheme through the UE's scheduling request may cause a total delay of 9.5 ms.

Figure 7:
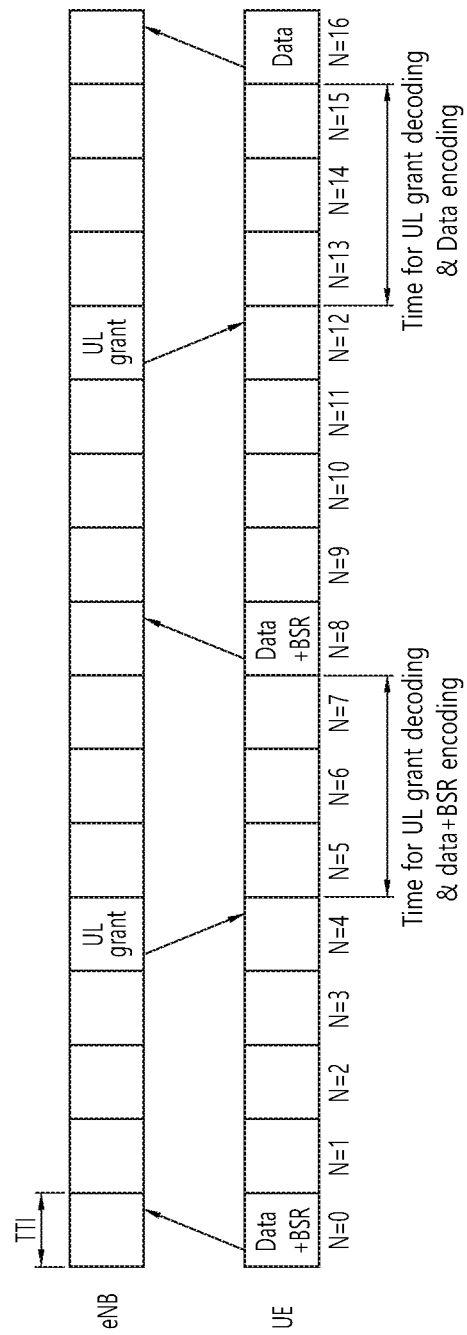
FIG. 7 shows time required for an uplink resource allocation scheme through a scheduling request and a buffer status report in 3GPP LTE.

FIG. 7 shows time required for an uplink resource allocation scheme through a scheduling request and a buffer status report in 3GPP LTE.

Referring to FIG. 7, a UE transmits data and a BSR to a BS, and the BS transmits a UL grant to the UE. The UE decodes the UL grant and encodes the data and the BSR for a certain period of time. Then, the UE transmits the encoded data and BSR to the BS, the BS transmits a UL grant to the UE, and the UE transmits data to the BS according to the UL grant. This uplink resource allocation scheme through the UE's scheduling request and BSR may cause a total delay of 17.5 ms.

That is, it may take 9.5 ms to 17.5 ms in total for a UE, which has switched to the connected state, to occupy a radio resource and to transmit data. Since it takes 85 ms in total to switch the connection state of a UE in the idle state, the total time required for the UE in the idle state to transmit data may be 94 ms to 102.5 ms. Therefore, a connectionless transmission scheme may be considered to reduce time delay caused by the connection state switch of the UE.

Generally, a UE that has no data to transmit switches to the idle state to save power or to reduce network overhead. The UE in the idle state needs to switch to the connected state in order to transmit or receive data. A connection state switch process generates a large amount of signaling between a BS and a UE. Since the UE needs to transmit a signal a plurality of times in order to process a large amount of signaling, battery consumption is increased and a delay occurs before data transmission. Thus, it is inefficient establish a connection even when the UE transmits or receives a small amount of data once or twice. When a connectionless transmission scheme is applied, it is possible to reduce the number of signaling times for connection setup, thereby efficiently reducing a transmission delay and battery consumption.

A random access method for an existing LTE system is disadvantageous in that when a collision occurs when transmitting a random access preamble (message 1), a collision also occurs when transmitting message 3. It is important for UEs that perform connectionless transmission to reduce the number of transmissions as much as possible in order to reduce battery consumption of the UEs and a transmission delay. Therefore, the present invention proposes a connectionless transmission procedure for increasing the probability that a BS decodes message 3 even when a collision occurs in message 1.

Nokia Solutions and Networks (NSN)'s patent on an enhanced random access channel procedure is a technique in which UEs select different DMRSs according to predefined rules when transmitting message 3. When this technique is applied, different UEs, which have received the same UL grant via message 2 due to the occurrence of a collision between random access preambles in message 1, select different DMRSs when transmitting message 3, thereby increasing the probability that a BS decodes message 3.

However, since a procedure for contention resolution after message 3 is not designed, it may be assumed that a contention resolution procedure is performed by applying message 4 in the existing LTE system. In this case, even though signals from a plurality of UEs are successfully received via message 3, a BS can transmit message 4 in response to a signal from only one UE, and thus the remaining UEs need to retransmit a random access preamble. In order to solve this problem, an operation for transmitting uplink data on the basis of connectionless transmission is illustrated below.

A connectionless transmission procedure proposed in the present invention includes messages 1 to 4. Message 1 is a random access preamble that a UE transmits to a BS, and message 2 is a random access response that the BS transmits to the UE. Message 3 includes uplink data that the UE transmits to the BS using scheduling information included in message 2. Message 4 is a response signal that the BS transmits to the UE in response to the uplink data. Through the response signal of message 4, the UE can determine whether a signal transmitted by the UE via message 3 is successfully transmitted. The transmission of the signal by the UE may fail due to a poor channel state or the occurrence of a collision between different UEs.

The present invention includes: performing, by a UE, a scheduling request using a random access preamble; receiving a random access response from a BS; arbitrarily selecting, by the UE, a reference signal from a scheduled resource to transmit data; and receiving, by the UE, a response signal (ACK/NACK signal or contention resolution signal) mapped to the reference signal. Here, the term "contention resolution" corresponds to conflict resolution, and the two terms are interchangeable in this specification.

In this four-step uplink connectionless transmission, uplink data transmission is performed before contention resolution. In two-step connectionless transmission, the collision probability is high and only fixed-size uplink transmission is possible. In 6-step connectionless transmission, data is transmitted after collision resolution, but a delay additionally occurs and the power consumption of a UE is increased. Therefore, a technique for reducing the data collision probability is needed for 4-step uplink connectionless transmission.

In order to perform the foregoing operations, preamble information for connectionless transmission and information on a preamble transmission resource, a rule used when a UE arbitrarily maps a reference signal, and a method for transmitting a response signal mapped to a reference signal are required. The information may be notified in advance by the BS to a UE via broadcast or may be designated in advance in a particular manner.

Message 4, which is a response signal, includes UE identifier information for each orthogonal reference signal. When the UE identifier information is NULL, this means that a BS has not received a signal corresponding to a reference signal or the BS has failed to decode the received signal.

Since contention resolution is not completed in the step of transmitting message 3 by the UE, the BS includes the UE identifier (for example, UE ID) information, d through message 3, in message 4, thereby completing contention resolution. When the UE receives a UE identifier corresponding to a reference signal transmitted by the UE via message 4, the UE may confirm that contention resolution has been completed and that uplink data in message 3 has been successfully transmitted.

When the UE randomly selects one of orthogonal reference signals when transmitting message 3, the BS needs to transmit a UE identifier for each reference signal. For a message 3 signal, the BS performs blind decoding on orthogonal reference signals. The BS can identify UE identifier (for example, UE ID) information of a received signal only when successfully decoding the message 3 signal. Therefore, when the BS fails to decode the message 3 signal, the BS cannot identify the UE identifier information corresponding to the reference signal. When the UE identifier information is not identified, the UE identifier information is displayed as NULL. Also, when there is no UE transmitting a signal using a particular reference signal, the UE cannot identify UE identifier information corresponding to the particular reference signal.

Figure 8:
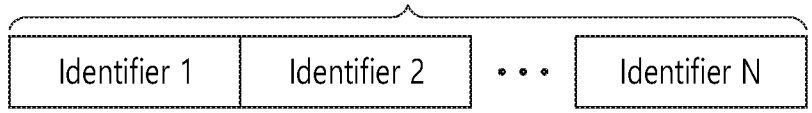
FIG. 8 shows an example of the configuration of UE identifier information in message 4 in a case of N orthogonal reference signals according to an embodiment of the present invention.

FIG. 8 shows an example of the configuration of UE identifier information in message 4 in a case of N orthogonal reference signals according to an embodiment of the present invention.

Figure 9:
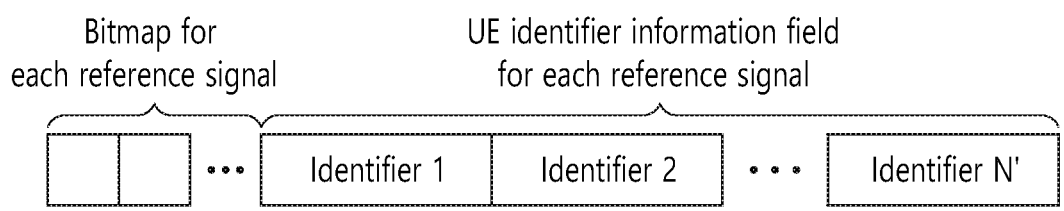
FIG. 9 shows another example of the configuration of UE identifier information in message 4 in a case of N orthogonal reference signals according to an embodiment of the present invention.

In FIGS. 8 and 9, it is assumed that there are N reference signals that a UE can select and a UE identifier is represented by L bits. FIG. 8 shows an embodiment in which the arrangement of UE identifiers is specified in advance according to the reference signal index. The number of the UE identifiers, N, is equal to the number of orthogonal reference signals that can be selected when transmitting message 3. When bits for UE identifier information are all zeros, this means NULL.

FIG. 9 shows another example of the configuration of UE identifier information in message 4 in a case of N orthogonal reference signals according to an embodiment of the present invention.

FIG. 9 shows the configuration of UE identifier information including a bitmap for each reference signal. The bitmap includes a total of N fields, but a UE identifier information field for each reference signal may includes N' fields, where N' is smaller than N. When the bitmap is 1, there is UE identifier information for a corresponding reference signal. When the bitmap is 0, there is no UE identifier information for a corresponding reference signal. Therefore, the configuration may include only the UE identifier information field for each reference signal in which the existence of the UE identifier information is indicated by the bitmap. Accordingly, it is possible to reduce the amount of information by defining a bitmap for each reference signal.

For example, UE identifier information corresponding to each reference signal may be configured as below in Table 1. Here, L may be 4 but may be changed variously without being limited thereto.

TABLE 1

| UE identifier information for each reference signal | Meaning |
| --- | --- |
| 0000 | (NULL) Failed to receive message 3. UE repeats random access procedure. |
| 0001-FFFF | UE identifier information obtained by BS via message 3. |

For example, when the BS determines that the reason for the failure of receiving message 3 is a collision between data, the BS transmits an indicator indicating that a collision has occurred via message 4. When the channel quality (for example, signal-to-noise ratio (SNR)) measured using an orthogonal reference signal is a specified value or greater but decoding fails, the BS may determine that a collision has occurred.

When different UEs transmit message 3 via the same resource, the BS considers a signal from one UE as noise and decodes a signal from the other UE. When the UEs select reference signals orthogonal to each other, the SNR of a reference signal does not include a reference signal of the other UE as noise, whereas the SNR of data includes the reference signal of the other UE as noise. Therefore, when the SNR of the reference signal is sufficient but data decoding fails, it may be determined that a collision between data occurs.

When different UEs select the same reference signal and the arrival times of the signals transmitted from the two UEs are within a cyclic prefix (CP), the sum of the reference signals transmitted from the two UEs is the size of the reference signal received by the BS. In this case, although the SNR of the reference signal is high, a channel of each UE cannot be estimated due to the overlap of the reference signals, so that the BS fails to decode data. Therefore, when the SNR of the reference signal is sufficient but data decoding fails, it may be determined that a collision occurs.

In another example, when the BS determines that the reason for the failure of receiving message 3 is a channel characteristic, the BS transmits scheduling information for retransmitting message 3 via message 4. When the channel quality (for example, SNR) measured using an orthogonal reference signal is a specified value or less and decoding fails, the BS may determine that a collision has occurred. That is, on the contrary to the above description, the reference signals of message are orthogonal to each other, the SNR of the reference signals are low, and thus data decoding may fail.

An information field of message 4 may be configured as below in Table 2 in a case where the BS fails to receive message 3.

TABLE 2

| UE identifier information for each reference signal | Meaning |
| --- | --- |
| 0000 | Failed to receive message 3. Since failure is determined due to collision, UE repeats random access procedure. |
| 0001 | Failed to receive message 3. Since failure is determined due to poor channel, UE retransmit message 3 via indicated scheduling resource. |
| 0002-FFFF | UE identifier information obtained by BS via message 3 |

For example, the cyclic redundancy check (CRC) of a DL grant for message 4 or the CRC of a message 4 signal is masked with the same temporary RNTI so that UEs receiving the same message 2 to receive the same temporary RNTI and scheduling information can decode a response signal. Here, the same temporary RNTI may correspond to a common temporary RNTI.

Since contention resolution is not completed at the time of transmitting message 3, different UEs may transmit message 3 via the same resource. All the UEs transmitting message 3 need to be able to verify through message 4 whether message 3 has been successfully transmitted or whether contention resolution has been completed. Therefore, it is necessary to enable UEs transmitting message 3 via the same resource to receive a message 4 signal using the same temporary RNTI. That is, the BS multicasts message 4 to the UEs transmitting message 3, and the UEs receiving message 4 can decode message 4 using the same temporary RNTI.

In another example, UEs receiving the same message 2 can decode message 4 using different temporary RNTIs. To this end, the BS transmits a temporary RNTI value for each reference signal when transmitting message 2. Alternatively, the BS transmits one temporary RNTI value when transmitting message 2 according to a previous engagement with the UE, and allocates a temporary RNTI value following the one temporary RNTI value to the remaining reference signals.

The above technique requires a greater number of RNTI resources and involves an increase in the number of DL grants for scheduling of message 4. However, when transmitting message 4, it is possible to transmit a signal to each UE using different resources, not by MU-MIMO, thus stably transmitting message 4. For example, a CRC masking ID for message 4 may be configured as function(CRC masking ID for message 3). Here, z=function(x, y) corresponds to any function having x and y as input parameters and z as an output parameter. This function needs to be known by the BS and the UE according to predetermined rules. That is, the BS unicasts message 4 to the UEs transmitting message 3, and the UEs receiving message 4 can decode message 4 using respective temporary RNTIs.

Further, when transmitting message 3, the UE randomly selects one of the reference signals orthogonal to each other. When the reference signals are a sequence and are orthogonal even though the sequence is cyclically shifted, the UE randomly selects the cyclic shift value.

For example, the UE receives message 2 and identifies the range of orthogonal reference signals available for transmission of message 3. Message 2 includes scheduling information for transmission of message 3. As the size of resources (or resource blocks) available for transmission of message 3 increases, the number of orthogonal reference signals may increase. Thus, the number of orthogonal reference signals may be designated via message 2 while performing resource allocation. Alternatively, when the number of orthogonal reference signals according to the resource size is shared in advance between the BS and the UE, the UE can implicitly determine the number of orthogonal reference signals according to the resource size in message 2.

In another example, the UE randomly selects one of the orthogonal reference signals considering the importance of an uplink signal. For example, when there are a total of N orthogonal reference signals, the UE may select one of the N orthogonal reference signals in a case of priority 0, may select one of the N/2 orthogonal reference signals in a case of priority 1, may select one of the N/4 orthogonal reference signals in a case of priority 2, and may select one of the N/8 orthogonal reference signals in a case of priority 3. Alternatively, when there are a total of N orthogonal reference signals, the UE may select one of the N/2 orthogonal reference signals in a case of priority 0, may select one of the N/4 orthogonal reference signals in a case of priority 1, and may select one of the N/4 orthogonal reference signals in a case of priority 2 and priority 3. In the above examples, it is assumed that reference signal sets for the respective priorities are mutually exclusive.

Further, the UE waits for message 4 for a specified time. When message 4 is not received within the specified time, it is considered that transmission of message 3 has failed. When message 4 is received within the specified time, the UE considers that transmission of message 3 is successful if receiving a UE identifier the same as the UE identifier thereof, and considers that transmission of message 3 has failed if not receiving the UE identifier the same as the UE identifier thereof. When determining that transmission of message 3 has failed, the UE restarts transmitting a random access preamble. Alternatively, when the BS transmits, using the message 4, a command to retransmit message 3 with respect to a signal using a particular reference signal of message 3, the UE using the particular reference signal retransmits message 3.

The BS also uses a correlation peak value of a random access preamble received via message 1 in order to reduce the overhead of blind decoding of message 3. Upon receiving a random access preamble in message 1, the BS derives a time advance (TA) value while detecting the preamble. The BS determines a TA based on the largest value of autocorrelation values of the preamble. When different UEs use the same preamble, the BS may have a plurality of largest autocorrelation values. Therefore, a threshold value is set and the BS performs blind decoding as many times as the number of autocorrelation values that exceeds the threshold value, thereby reducing complexity.

It is assumed in the present invention that reference signals used for transmitting message 3 are mutually orthogonal, but the present invention is not limited thereto. In particular, when reference signals use the same time/frequency resource and use different code resources, the reference signals may have a quasi-orthogonal property.

Figure 10:
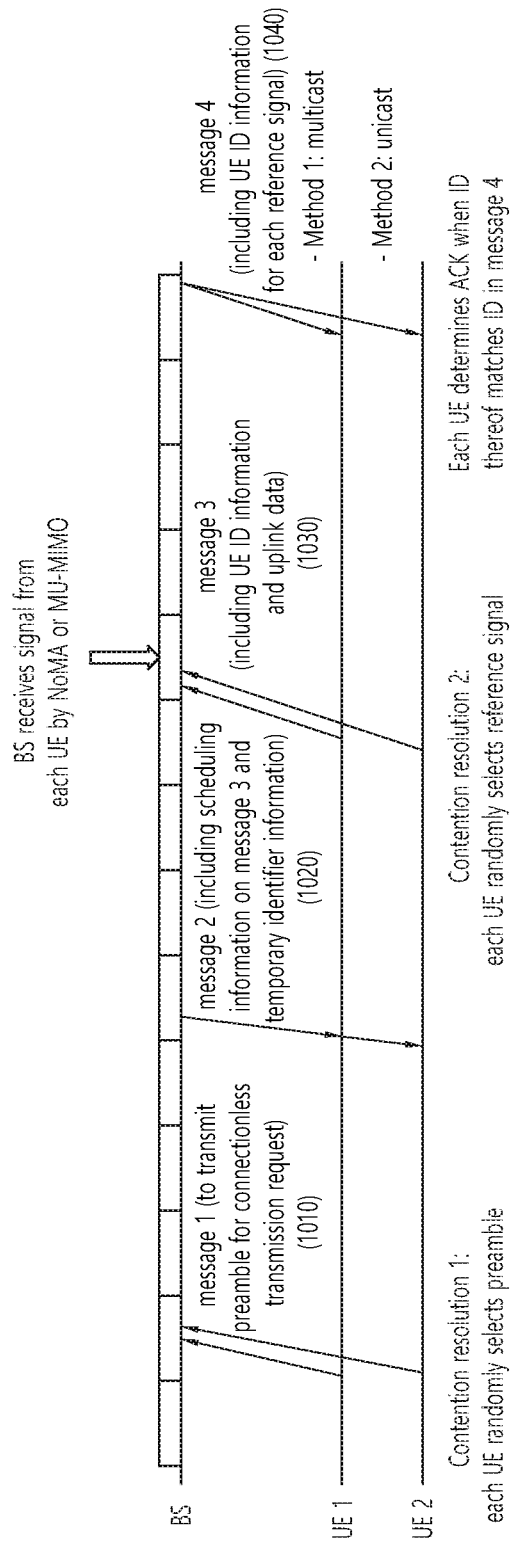
FIG. 10 shows an example of an operation performed between a UE and a BS based on connectionless transmission according to an embodiment of the present invention.

FIG. 10 shows an example of an operation performed between a UE and a BS based on connectionless transmission according to an embodiment of the present invention.

UE 1 and UE 2 transmit message 1 1010 including a preamble for a connectionless transmission request to a BS. Since each UE transmits the preamble through the same resource, a collision may occur. To resolve this collision, each UE randomly selects the preamble.

In response, the BS transmits message 2 1020 to UE 1 and UE 2 that ave transmitted the preamble. Message 2 includes scheduling information on message 3 1030 and temporary identifier information. Since both UE 1 and UE 2 transmit message 3 1030 according to the scheduling information included in message 2, a collision may also occur in this case. To resolve this collision, each UE randomly selects a reference signal.

UE 1 and UE 2 transmit message 3 including UE identifier information and uplink data to the BS. The BS receives a signal from each UE in a non-orthogonal multiple access (NoMA) scheme or a multi-user multiple-input and multiple-output (MU-MIMO) scheme. When the NoMA scheme is used, the BS first decodes message 3 transmitted by UE 1, cancels this process, and then decodes message 3 transmitted by UE 2.

Upon receiving message 3, the BS transmits message 4 including UE identifier information corresponding to each reference signal to UE 1 and UE 2. When UE 1 and UE 2 receive UE identifier information thereof through message 4, UE 1 and UE 2 may determine that the uplink data has been successfully transmitted via message 3. That is, each UE determines that the uplink data is acknowledged when the UE identifier information thereof matches the UE identifier information via message 4.

Here, message 4 may be transmitted in a multicast mode or in a unicast mode. In the multicast mode, UE identifier information relating to signal successfully received by the BS is included per reference signal in message 4. A temporary identifier transmitted via message 2 may be a common temporary identifier common to all UEs.

In the unicast mode, a temporary identifier of message 4 is changed according to the reference signal of message 3. The BS transmits a mapping relationship between a reference signal and a temporary identifier to the UEs when transmitting message 2. The temporary identifier transmitted via message 2 may be a separate temporary identifier for each UE.

Figure 11:
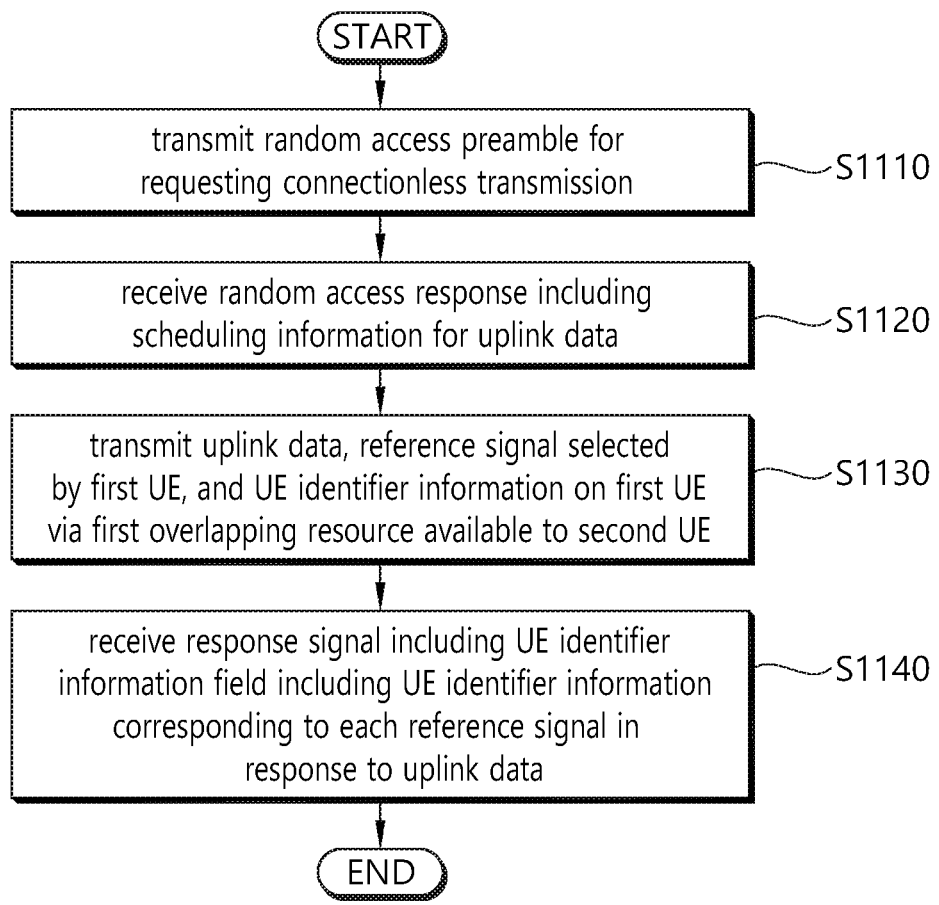
FIG. 11 is a flowchart illustrating a procedure for transmitting uplink data on the basis of connectionless transmission according to an embodiment of the present invention.

FIG. 11 is a flowchart illustrating a procedure for transmitting uplink data on the basis of connectionless transmission according to an embodiment of the present invention.

Defining terms first, a connectionless transmission procedure may correspond to a procedure in which a UE transmits data to a BS in a state where a connection between the UE and the BS is not established. The state where the connection between the UE and the BS is not established may correspond to an RRC-unconnected state, an idle state, or an inactive state.

First, in step S1110, a first UE transmits a random access preamble for requesting connectionless transmission to a BS. Here, it is assumed that the first UE and a second UE transmit a random access preamble to the BS via the same resource and perform a connectionless transmission procedure. When the same resource is referred to as a second overlapping resource, the first UE and the second UE transmit the random access preamble via the second overlapping resource. The random access preamble may correspond to message 1 in a random access procedure.

In step S1120, the first UE receives a random access response including scheduling information for uplink data from the BS. The second UE also transmits the random access preamble and thus may also receive the random access response including the scheduling information for the uplink data from the BS. The random access response may correspond to message 2 in the random access procedure.

In step S1130, the first UE transmits the uplink data, a reference signal selected by the first UE, and UE identifier information on the first UE via a first overlapping resource available to (used by) the second UE. Since the first UE and the second UE receive the same scheduling information for the uplink data fro BS, the first UE and the second UE transmit uplink data via the first overlapping resource. Here, each UE arbitrarily selects a reference signal for contention resolution. The uplink data may be transmitted via the first overlapping resource in a non-orthogonal multiple access (NoMA) scheme or a multi-user multiple-input and multiple-output (MU-MIMO) scheme. That is, the BS receives a signal from each UE via the overlapping resource in the NoMA scheme or the MU-MIMO scheme. The uplink data, the reference signal selected by the first UE, and the identifier information on the first UE may be included in message 3 in the random access procedure.

In step S1140, the first UE receives a response signal including a UE identifier information field including UE identifier information corresponding to each reference signal in response to the uplink data. The response signal may correspond to message 4 in the random access procedure.

The UE identifier information field further includes a bitmap indicating whether there is UE identifier information corresponding to each reference signal. The UE identifier information corresponding to each reference signal includes UE identifier information corresponding to the reference signal selected by the first UE and UE identifier information corresponding to a reference signal selected by the second UE according to the bitmap. That is, the UE identifier information field includes UE identifier information that corresponds to a reference signal selected by each UE one to one.

Here, when the UE identifier information corresponding to the reference signal selected by the first UE indicates NULL, the random access preamble is retransmitted or scheduling information for retransmitting the uplink data is included in the response signal. The UE identifier information corresponding to each reference signal included in the UE identifier information field indicates NULL, which means that the BS has failed to decode message 3 transmitted by a UE that has selected the corresponding reference signal. When the reason for the failure of decoding of message 3 is a collision between data, the UE needs to perform the random access procedure again. When the reason for the failure of decoding of message 3 is poor channel quality, the BS includes scheduling information for retransmitting the uplink data in the response signal once again.

On the contrary, when the UE identifier information corresponding to the reference signal selected by the first UP does not indicate NULL, the UE identifier information corresponding to the reference signal selected by the first UE is the UE identifier information on the first UE. Thus, the first UE verifies that the UE identifier information thereof matches the UE identifier information transmitted via the response signal and determines the response signal as an ACK.

The response signal may be multicast or unicast to the first UE and the second UE. According to a multicast scheme, the random access response may further include a common temporary ID for the UE and the second UE, and the first UE and the second UE may decode the response signal using the common contemporary ID. According to a unicast method, the random access response may further include a first temporary ID for the first UE and a second temporary ID for the second UE, the first UE may decode the response signal using the first temporary ID, and the second UE may decode the response signal using the second temporary ID. That is, the BS transmits a mapping relationship between reference signal and a temporary ID to a UE when transmitting the random access response. The temporary ID transmitted via the random access response may be a separate temporary ID for each UE.

Figure 12:
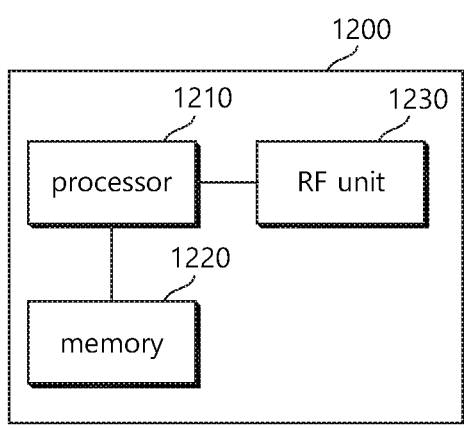
FIG. 12 is a block diagram showing an apparatus for wireless communication for implementing an embodiment of the present invention.

FIG. 12 is a block diagram showing an apparatus for wireless communication for implementing an embodiment of the present invention.

An apparatus 1200 for wireless communication includes a processor 1210, a memory 1220 and a radio frequency (RF) unit 1230.

The processor 1210 may be configured to implement proposed functions, procedures and/or methods described in this description. Layers of the radio interface protocol may be implemented in the processor 1210. The processor 1210 may handle a procedure explained above. The memory 1220 is operatively coupled with the processor 1210, and the RF unit 1230 is operatively coupled with the processor 1210.

The processor 1210 may include application-specific integrated circuit (ASIC), other chipset, logic circuit and/or data processing device. The memory 1220 may include read-only memory (ROM), random access memory (RAM), flash memory, memory card, storage medium and/or other storage device. The RF unit 1230 may include baseband circuitry to process radio frequency signals. When the embodiments are implemented in software, the techniques described herein can be implemented with modules (e.g., procedures, functions, and so on) that perform the functions described herein. The modules can be stored in memory 1220 and executed by processor 1210. The memory 1220 can be implemented within the processor 1210 or external to the processor 1210 in which case those can be communicatively coupled to the processor 1210 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for transmitting, by a first user equipment (UE), uplink data in a wireless communication system, the method comprising:
   transmitting a random access preamble for requesting connectionless transmission;
   receiving a random access response comprising scheduling information for the uplink data;
   transmitting the uplink data, a first reference signal selected by the first UE, and UE identifier information on the first UE via a first overlapping resource available to a second UE; and
   receiving a response signal comprising a UE identifier information field in response to the uplink data, wherein the UE identifier information field comprises first UE identifier information for the first reference signal and second UE identifier information for a second reference signal, wherein the second reference signal is selected by the second UE,
   wherein the UE identifier information field further comprises a bitmap indicating whether there is the first UE identifier information and the second UE identifier information, and
   wherein when the first LTE identifier information indicates NULL, the random access preamble is retransmitted or scheduling information for retransmitting the uplink data is comprised in the response signal.

2. The method of claim 1, wherein the random access response further comprises a common temporary identifier for the first UE and the second UE, and
   the response signal is decoded by the first UE and the second UE using the common temporary identifier.

3. The method of claim 2, wherein the response signal is multicast to the first UE and the second UE.

4. The method of claim 1, wherein the random access response comprises a first temporary identifier and is transmitted to the first UE,
   the random access response comprises a second temporary identifier and is transmitted to the second UE,
   the response signal is decoded by the first UE using the first temporary identifier, and
   the response signal is decoded by the second UE using the second temporary identifier.

5. The method of claim 4, wherein the response signal is unicast to the first UE and the second UE.

6. The method of claim 1, wherein when the first UE identifier information does not indicate NULL, the first UE identifier information is the UE identifier information on the first UE.

7. The method of claim 1, wherein the random access preamble is transmitted via a second overlapping resource used by the second UE.

8. The method of claim 1, wherein the uplink data is transmitted via the first overlapping resource in a non-orthogonal multiple access (NOMA) scheme or a multi-user multiple-input and multiple-output NU-MIMO) scheme.

9. The method of claim 1, wherein the uplink data is transmitted by the first UE and the second UE having a connection with a base station not established.

10. A user equipment (UE) for transmitting uplink data in a wireless communication system, the UE comprising:
    a radio frequency (RF) unit to transmit and receive a radio signal; and
    a processor connected to the RF unit,
    wherein the processor is configured to:
    transmit a random access preamble for requesting connectionless transmission;
    receive a random access response comprising scheduling information for the uplink data;
    transmit the uplink data, a first reference signal selected by the UE, and UE identifier information on the UE via a first overlapping resource available to another UE; and
    receive a response signal comprising a UE identifier information field in response to the uplink data, wherein the UE identifier information field comprises first UE identifier information for the first reference signal and second UE identifier information for a second reference signal, wherein the second reference signal is selected by the another UE,
    wherein the UE identifier information field further comprises a bitmap indicating whether there is the first UE identifier information and the second UE identifier information, and
    wherein when the first UE identifier information indicates NULL, the random access preamble is retransmitted or scheduling information for retransmitting the uplink data is comprised in the response signal.

11. The UE of claim 10, wherein when the first UE identifier information does not indicate NULL, the first UE identifier information is the UE identifier information on the UE.

* * * * *